106. COMPOSITIONS,
COATING OR PLASTIC.

Patented Aug. 15, 1939

2,169,980

UNITED STATES PATENT OFFICE 2,169,980

CEMENT MIX

Edward W. Scripture, Jr., Shaker Heights, Ohio, assignor to The Master Builders Company, Cleveland, Ohio, a corporation of Ohio No Drawing. Original application November 6, 1934, Serial No. 751,747. Divided and this application January 9, 1939, Serial No. 249,883

8 Claims. (Cl. 106—27)

This invention relates to hydraulic cements, mortars and the like, and particularly to means to increase the fluidity of a cement or mortar mix, so that the fluidity of a mix containing a given amount of water will be substantially increased, or so that the amount of water required for a mix of a given degree of fluidity or plasticity will be substantially reduced, the present application being a division of my copending application Serial No. 751,747, filed November 6, 1934.

It is well known that the properties of concrete are influenced by the amount of water employed in the mix. A certain quantity of water is required in order that the cement, sand, gravel or other ingredients of the mix can be properly mixed together, so that the material will flow readily, and can be worked satisfactorily, but it has been found that the water content of the mix should be kept as low as possible as the strength and density of the finished concrete is reduced by an increase in the water content.

It is an object of the present invention to provide means to increase the fluidity of a mix of concrete without increasing the amount of water employed in the mix.

A further object of the invention is to provide means to produce a concrete mix having a given degree of fluidity, while employing a substantially smaller quantity of water than has heretofore been required to secure this degree of fluidity.

Another object of the invention is to provide an improved concrete which can be worked easily and readily, and which shrinks less in hardening than the concrete now employed, and which, when hardened, is denser and less permeable than the concrete now in use.

A further object of the invention is to provide a plasticizing agent which can be added to a batch of concrete or the like as it is being mixed, or to one of the ingredients before the material is mixed, and which will increase the fluidity of the mix compared to that of a similar mix prepared without the plasticizing agent.

Other objects of the invention and features of the invention will be apparent from the following description.

I have found that the plasticity or fluidity of a mix of concrete is greatly increased by the presence of a small quantity of an agent belonging to the group of extracts or compounds obtained from wood, such as pyroligneous acid, pyrogallic acid and waste sulphite liquor. Plasticizing agents in this group have the property of materially lowering the surface tension of water, but they may not foam. They are, however, soluble or dispersable in water and are not highly unsaturated.

As to the pyroligneous acid and the pyrogallic acid, these acids added in the proportion of .001% to .04% of the weight of the cement are highly effective. When using waste sulphite liquor, it has been found that one-half pint to one and one-half pints per standard sack of cement provide the desirable quantity of fluidity-increasing ingredients for the mix. It is to be understood that the percentages just mentioned are those which have been found desirable, but quantities either more or less may be very useful in increasing the fluidity of the cement mix.

The mix is prepared in the usual manner, except for the addition of the plasticizing agent. The completed mix, because of the presence of the plasticizing agent, is much more fluid and flows more readily than a similar mix prepared with the same quantity of water, but without the plasticizing agent. Because of the greater fluidity, the mix is more readily workable, is of increased density, and is more cohesive, thereby preventing segregation of the aggregates of the mix.

Because of the increase in the fluidity of the mix, which is produced by the plasticizing agent provided by my invention, it is possible to reduce the amount of water employed in a mix and still produce a mix having a satisfactory degree of fluidity so as to be workable, and this reduction in the amount of water produces a concrete of increased strength and density. This also makes possible the use of leaner mixtures, that is, mixtures having relatively smaller amounts of cement than usually employed. This results in a substantial saving and produces a concrete which shrinks less than those produced by the mixes now employed, while the concrete is as strong or stronger than those prepared without the plasticizing agent provided by my invention.

An advantageous plasticizing and indurating composition for addition to batches of mortar, hydraulic cement and the like in the process of mixing may be made by incorporating the plasticizing agent in a gelatinous inorganic colloid of ferric hydroxide, ferrous hydroxide, aluminosilicic acid, silicic acid or the like. The gelatinous inorganic colloid adds to the plasticity of the mix and tends to make the concrete or mortar more cohesive, preventing segregation or honeycombing.

The plasticizing and indurating mixture to be mixed with the cement or mortar may contain a finely divided, inorganic, inert solid, such as diatomaceous earth, talc, pumicite, or the like, in order to supply a fine material to the mix, which serves to fill voids in the finished product. Such fine materials tend to stiffen the mix, so that more water is required to obtain the same flowability as in mixes lacking the fine material. By utilizing the plasticizing agent in a mix with the fine materials, a lower water-cement ratio may be maintained.

In some instances it is advantageous to mix the plasticizing agent with a pozzuolanic material, such as volcanic ash, trass, or reactive silica, either in dry form or as a gelatinous colloid. Pozzuolanic materials have the property of combining with free lime in the cement or, separated by the cement, forming additional cementitious compounds and retarding corrosion of the concrete. Pozzuolanic materials, when added to a concrete mix, ordinarily necessitate a substantial increase in the water-cement ratio and tend to weaken the concrete and increase shrinkage. However, when added together with the plasticizing agent above described, the water-cement ratio may be kept low and the advantages of the pozzuolanic material may be obtained without the disadvantages consequent upon an increase in the water-cement ratio.

A concrete or mortar mix in which metallic particles replace a portion or all of the sand is commonly applied to the surface of mortar or concrete before it has set in order to make the concrete or mortar more wear-resistant and more impermeable. It has been difficult to introduce such a metallic aggregate as a dry shake and to work it into the surface properly without the use of excess water, which promotes crazing, checking and shrinkage.

By mixing the plasticizing agent of the present invention with the metallic aggregate, much less water is required, the application to the mortar or concrete is facilitated, and the difficulties heretofore experienced are eliminated. With a suitable electrolyte, such as calcium chloride, to promote oxidation in the case of iron or steel aggregate, the mixture of plasticizing agent and metallic aggregate may be used integrally in the cement mix, because the increase in volume of the metallic particles on partial or complete conversion to oxide fills the voids, neutralizes the tendency of the mortar to contract during hardening, and may even be made to cause a slight expansion.

Such waterproofing materials as stearates or stearic acid may be added to the mix in the form of a paste sufficiently mobile to mix homogeneously with the mortar or concrete. The plasticizing agent, waste sulphite liquor, or the like, alone, or with an inorganic colloid in combination, may be advantageously mixed with the stearate or stearic acid, making it possible to have a greater percentage of stearate in a mixture having sufficient fluidity to mix easily with the mortar or concrete.

The action of the plasticizing and indurating compositions herein described is not affected by the presence of an accelerator, which is sometimes used.

The plasticizing agent may be added to the concrete or mortar at the time of mixing, or it may be combined with the aggregate or cement which is to be used in the mix, or it may be added to the water with which the mix is tempered.

From the foregoing it will be seen that I have provided a plasticizing agent which can be readily added to concrete mixes, and which substantially increases the fluidity or flowability of the mix over that of a similar mix prepared without this agent. It will be seen, also, that because of the increased flowability produced by the plasticizing agent provided by my invention, the quantity of water employed in the mix can be substantially reduced, thereby providing a superior concrete, while additional aggregates may be added to the mix without it becoming necessary to increase the water content of the mix to an unsatisfactory degree, as has heretofore been required.

Furthermore, it is to be understood that the particular compounds disclosed, and the procedure set forth, are presented for purposes of explanation and illustration, and that various equivalents can be used and modifications of said procedure can be made without departing from my invention as defined in the appended claims.

What I claim is:

1. A mortar or cement mix containing the ingredients of waste sulphite liquor in substantially the proportion provided by the addition to the mix of from one-half pint to one and one-half pints of waste sulphite liquor per sack of cement.

2. A concrete comprising a mixture of hydraulic cement and aggregate, and containing the ingredients of waste sulphite liquor in substantially the proportion provided by the addition to the mix of from one-half pint to one and one-half pints of waste sulphite liquor per sack of cement.

3. A mortar or cement containing an organic gelatinous colloid and the ingredients of waste sulphite liquor in substantially the proportion provided by the addition to the mix of from one-half pint to one and one-half pints of waste sulphite liquor per sack of cement.

4. As an intermediate product, plastic cement concrete containing hydraulic cement and the water soluble constituents of waste sulphite liquor, which render the cement particles mutually repellant in the aqueous medium of a suitable concrete mix, thereby increasing the number of discrete particles therein for hydration, said plastic concrete possessing high workability and producing structural concretes of commercially acceptable compressive strengths by virtue of the presence therein of the constituents of waste sulphite liquor.

5. As an intermediate product, plastic cement concrete containing hydraulic cement and possessing high workability, and producing structural concrete of commercially acceptable compressive strengths by virtue of the presence therein of the water soluble constituents of waste sulphite liquor, which increase the number of discrete particles available for hydration by dispersing the individual cement particles throughout the aqueous mass.

6. As an intermediate product, a plastic cement mix comprising hydraulic cement having mixed therewith the water soluble constituents of waste sulphite liquor, and having the physical characteristics that when in an aqueous medium the particles disperse substantially completely, producing high workability, and, upon hydration, produce commercially acceptable compressive strengths.

7. A dry cement having materially increased workability in the wet state and producing structural concretes of normal compressive strengths comprising hydraulic cement and the water soluble constituents of waste sulphite liquor, which increase the number of discrete particles available for hydration by dispersing the individual cement particles throughout the aqueous mass.

8. As a new article of manufacture, a dry cement comprising hydraulic cement having mixed therewith the water soluble constituents of waste sulphite liquor, and having the physical characteristics that when in an aqueous medium the particles disperse substantially completely and possess increased workability, and, upon hydration, produce commercially acceptable compressive strengths.

EDWARD W. SCRIPTURE, Jr.